United States Patent

Naff, Jr.

[15] 3,684,925

[45] Aug. 15, 1972

[54] HOUSING AND FRAME ASSEMBLY FOR ENCLOSING AND SUPPORTING ELECTRONIC APPARATUS

[72] Inventor: Fredric L. Naff, Jr., Los Angeles, Calif.

[73] Assignee: Computer Transmission Corporation, Los Angeles, Calif.

[22] Filed: Feb. 1, 1971

[21] Appl. No.: 111,290

[52] U.S. Cl. .....................317/100, 174/52 R, 174/66

[51] Int. Cl. ............................H05k 7/20, H02b 1/10

[58] Field of Search...........174/15 R, 16 R, 52 R, 66; 317/99, 100, 101 R, 120

[56] References Cited

UNITED STATES PATENTS

| | | | |
|---|---|---|---|
| 2,790,951 | 4/1957 | Holtz | 174/52 S |
| 3,037,834 | 6/1962 | Lederer | 174/52 S |
| 3,573,343 | 4/1971 | Smidt | 174/52 R |
| 3,590,332 | 6/1971 | Anderson | 317/120 |
| 3,588,415 | 6/1971 | Berne | 174/66 |
| 3,106,602 | 10/1963 | Hartz | 174/66 |

FOREIGN PATENTS OR APPLICATIONS

| | | | |
|---|---|---|---|
| 1,190,539 | 4/1965 | Germany | 174/66 |

*Primary Examiner*—Lewis H. Myers
*Assistant Examiner*—Gerald P. Tolin
*Attorney*—John E. Wagner

[57] ABSTRACT

Disclosed is a housing and frame assembly for electronic apparatus in which the housing comprises two identical pan-shaped members which embrace a central, generally planar, structural support member. The two substantially identical cover members are arranged for either permanent or snap fitting engagement with the planar frame member whereby virtually instantaneous access to the electronic interior is available by snap removal. When assembled complete, the frame member and electronic assembly are virtually suspended with the sandwich-like structure for shock protection. When removed from the cover and base, the frame member is self-supporting whereby the electronic assembly may be manufactured or maintenance work may be performed to all sides of the electronic assembly without interference from its enclosure.

6 Claims, 5 Drawing Figures

HOUSING AND FRAME ASSEMBLY FOR ENCLOSING AND SUPPORTING ELECTRONIC APPARATUS

BACKGROUND OF THE INVENTION

Heretofore, electronic apparatus was characteristically supported on a metal frame member, commonly called a chassis, and enclosed within a housing or cabinet. It has been desired for many years that electronic assemblies be designed in which the chassis or frame and electronics are totally independent of the housing. In reality, seldom if ever has this been accomplished. Usually, the final step of manufacture of electronic apparatus involves the steps of mating the housing often containing parts of electronics to the chassis. Similarly, maintenance usually involves at least a partial disassembly of knobs and controls, or in some cases, large speakers or other attachments, before the chassis may be removed from the housing. Often the chassis relies upon the housing for support so that upon removal from the housing, the chassis must either be held in specially designed clamps or, in certain cases, blocked up on a workbench for maintenance.

Since typical chassis of the prior art are of thin punched steel, which is particularly unattractive and does not add to the appearance of the assembly, they are enclosed within a housing which provides the esthetics of electronic assembly. The net result is that electronic equipment which often consumes substantial power requires auxiliary cooling for the electronics. Usually cooling is provided in the form of an internal blower and louvers. Such systems are often marginal thermally and the operativeness and life of the electronic equipment often depends upon the life and integrity of a blower.

BRIEF STATE OF THE INVENTION

Given the foregoing state-of-the-art, I have invented a new electronic assembly in which the chassis takes the form of a relatively thick plate having recesses to accept taller electronic components and a number of stand-off feet sufficient to provide direct contact with the supporting table or surface. Associated with the chassis are a pair of preferably identical pan-shaped housing members, one designed for positioning beneath the plate and the second to overlie the plate and in registry with the edge to constitute a thin enclosing package. The housing members include appropriately placed holes to accept the feet of the chassis and to allow controls to extend through the housing. The chassis member of substantial thickness, in the order of one-eighth to one-fourth inch, is exposed between the edges of the covers around the entire periphery and the chassis is preferably coated with an effective heat radiating paint or finish. The chassis itself is thus directly exposed on all four sides for heat radiation. The chassis, likewise, being relatively thick and having substantial mass, is effective heat sink. More important, the frame member is simple in design, low in cost, and of superior strength to thin metal chassis whereby the electronic components are rigidly mounted on the frame while protected within the enclosing housing members.

DESCRIPTION OF THE DRAWINGS

The foregoing brief description of this invention may be more clearly understood from the following detailed description of the invention and by reference to the drawings, in which.

DETAILED DESCRIPTION OF THE INVENTION

Figure 1:
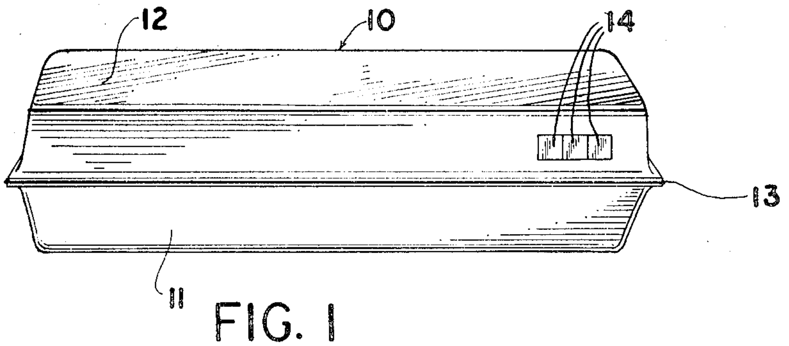
FIG. 1 is a front elevational view of an electronic package assembly in accordance with this invention.

Now referring to FIG. 1, the completed electronics assembly 10 in accordance with this invention is shown including a lower housing member or base 11, generally pan-shaped, and an upper housing member or cover 12 of virtually identical shape with the lower housing member. Between the two housing members may be seen the edge of the frame member 13 of this invention and extending through the upper housing are a number of controls 14. Also, support feet members 15 are visible below the lower housing member.

As is apparent in FIG. 1, the structure presents an attractive housing appearance with an apparent accent line along the center of the assembly. Where the housing is light in color, the accent line may be dark and, preferably, dull black in appearance. The accent line between the housing members 11 and 12 is in actuality the edge of frame member 13 which constitutes a heat radiator for the electronic apparatus contained within the housing.

Figure 2:
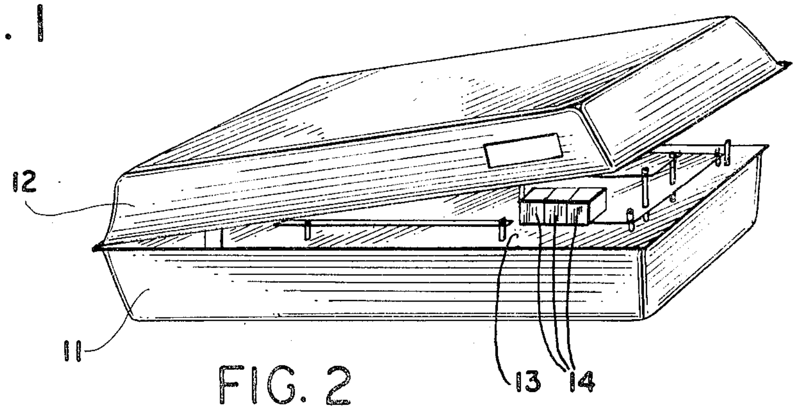
FIG. 2 is a front view of the assembly of FIG. 1 with the cover in the process of being removed.

Now referring to FIG. 2, the simple step necessary to obtain access to the electronic assembly contained therein within the housing may be seen. The upper housing is secured to the lower housing by an integral catch which is apparent in FIG. 4 below. The housing itself preferably is of inexpensive vacuum-formed plastic, such as, acrylonitrile butadiene styrene (ABS) of wall thickness in the order of one-sixteenth inch. This material and thickness provides sufficient rigidity to protect the electronic assembly within the enclosure and also has sufficient flexibility to allow the cover to be removed by distortion. The removal of the cover 12 is apparent with the user grasping the lower lips of the cover and by twisting motion, release one of the integral catches of FIG. 4. The controls 14 have sufficient clearance to release the cover upon this distortion movement and the cover 12 may then be removed.

Figure 3:
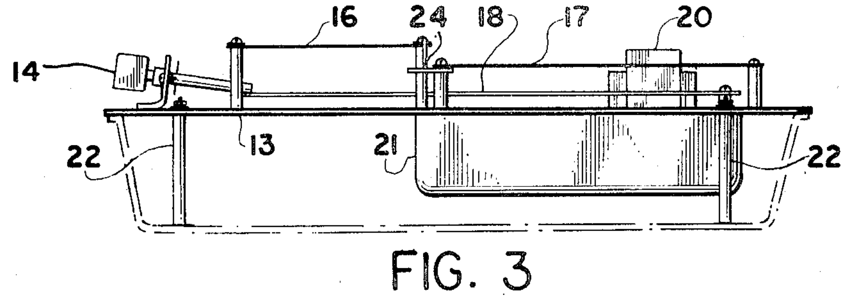
FIG. 3 is a front view of the chassis assembly of this invention with the cover removed and the base shown in phantom.

The assembly, after removal of the cover and separated from the base, is clearly visible in FIG. 3, with the frame member 13 shown supporting a number of printed circuit board assemblies 16, 17 and 18, and a power transformer 20 in a well 21. The frame member may be one unitary piece with well 21 formed therein or the wall may be a separate piece secured to the frame 13 by machine screws or brazing. In either case, the well 21 and frame 13 are effective conductors of heat generated either by the power transformer or the electronic circuit assemblies. The frame 13 supported all around its periphery and is cushioned thereby.

The frame 13 and its support structure are apparent with a number of upstanding pillars 22 secured directly to the frame in spaced positions. These pillars have sufficient height to position the frame above the supporting surface a distance to insure the well 21 and any electronic components will not contact the lower housing member under normal or static or impact loading conditions. The pillars have sufficient strength to support the frame and the entire assembly when separated from the housing. The pillars include integral screwholes to receive the feet 15 of FIG. 1.

Figure 4:
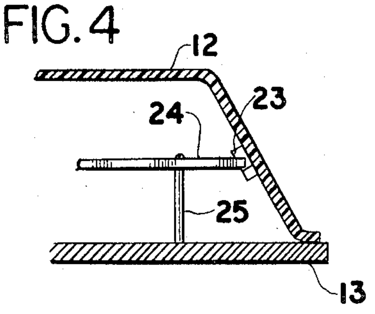
FIG. 4 is a detail of the locking assembly for the cover of this invention; and, FIG. 5 is a detailed view of the attachment arrangement for the frame to the base of the housing.

The form of attachment of the cover 12 to the frame 13 is illustrated in FIG. 4. One of the simpliest forms of fasteners is used, namely, an integral catch 23, which is formed in a U-shaped and secured to the inside surfaces of each end of the cover 12. The integral catch 23 may be a simple integral ridge as well. In either case, the catch 23 is designed to slide over and engage a portion of the frame assembly: in this case, to a cantilevered plate 24 secured by a pillar 25 to the frame 13 and of sufficient length of hold said integral catch. The distortion movement of the cover 12 shown in FIG. 2 disengages the integral catch 23 from the cantilevered plate 24. A similar catch arrangement is present in the opposite end of the cover 12.

Figure 5:
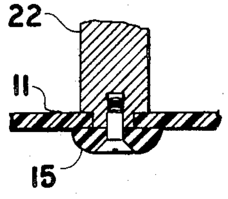

The details of the preferred arrangement for securing the lower housing 11 to the frame 13 is illustrated in FIG. 5. The pillar 22 includes an end recess which is threaded to receive a screw 26 to hold a rubber foot 15. The lower housing 11 is therefore detachably secured to the electronic assembly. Removal of the lower housing is accomplished namely by temporarily removing each screw 26 by removing the frame assembly from the lower housing and remounting the feet 15. The pillars 22 are located in spaced positions and particularly designed to support the frame in a stable position. It is further recognized that if circuitry and components are mounted on both sides of frame 13 and a maintenance operation may require access to the underside of frame 13, then the single ended pillars 22 may be replaced by double ended pillars with mating threads whereby upstanding pillars will extend above the frame 13 in its normal operating condition. When this arrangement, the entire assembly may be inverted and allowed to rest on the upper extending pillars.

From the foregoing, it may be seen that I have invented a new simple system for assembly of electronic apparatus employing two virtually identical housing members which sandwich a single, substantially planar frame member. Access to the electronics is readily obtained during manufacture and in maintenance. The housing may be readily removed and the equipment operated or tested apart from the housing and, at the same time, the arrangement not only produces an attractive appearance but additionally provides for effective thermal radiation in all directions.

The foregoing is representative of illustrative embodiments of this invention and is not to be construed as limiting. It is recognized that one skilled in the art can produce additional structures differing in appearance or circuit details while falling within the spirit and scope of the invention. Therefore, the true scope of the invention is defined by the following claims.

I claim:

1. An electronic apparatus assembly comprising:

a housing, including a pair of generally pan-shaped members having lip portions of comparable dimensions and shape whereby said pan portions, when placed in opposed opposite positions, are in registration;

frame for electronic apparatus to be positioned within said housing, said frame comprising a generally planar metal member of shape and dimensions approximating the shape and dimensions of the lip portions of said housing, said frame positioned between said pan shaped housing members with the lip portions thereof engaging the edge area of said frame and said housing members protecting electronic apparatus supported by said frame;

said frame including an edge portion extending beyond the lip portions of said housing thereby constituting a heat radiating peripheral region for said electronic apparatus;

support members secured to said frame and detachably secured to one of said pan shaped housing members;

said support members being of sufficient height to space said frame from said one pan shaped housing member and to support said frame from a supporting table or surface for manufacture or maintenance, when removed said house, both said pan shaped members being removable from said frame.

2. The combination in accordance with claim 1 wherein said support members constitute a number of support pillar members secured to said frame whereby said frame may stand free of said housing in a stable position.

3. The combination in accordance with claim 2 wherein the lower of said pan shaped housing members is secured to said upstanding pillar members.

4. The combination in accordance with claim 1 wherein said frame includes all operating controls and said housing members include appropriate cut-outs for said controls with sufficient clearance to allow said housing members to be removed without disengaging said controls.

5. The combination in accordance with claim 1 wherein the upper one of said pan shaped said housing members constitutes a cover and said pan shaped housing member includes an integral fastener means removably engaged with a portion of said frame.

6. The combination in accordance with claim 5 wherein said cover is of flexible plastic material whereby said housing cover is removed by manual distortion of said housing cover sufficient to release said fastener means.

* * * * *